United States Patent

Rounds

[11] Patent Number: 5,457,730
[45] Date of Patent: Oct. 10, 1995

[54] COMBINATION TELEPHONE SET AND SECURITY PANEL MONITOR

[75] Inventor: John Rounds, Plano, Tex.

[73] Assignee: Telestate International, L.P., Plano, Tex.

[21] Appl. No.: 250,818

[22] Filed: May 31, 1994

[51] Int. Cl.$^6$ .................................................. H04M 11/00
[52] U.S. Cl. .............................. 379/40; 379/96; 340/506; 340/525
[58] Field of Search ..................... 379/40, 39, 42, 379/43, 44, 45, 49, 50, 38, 96, 90, 110; 340/506, 525

[56] References Cited

U.S. PATENT DOCUMENTS

| | | | |
|---|---|---|---|
| 4,275,385 | 6/1981 | White | 340/525 |
| 4,622,538 | 11/1986 | Whynacht et al. | 340/525 |
| 4,897,854 | 1/1990 | Harris et al. | 375/22 |
| 4,994,909 | 2/1991 | Graves et al. | 348/7 |
| 5,192,999 | 3/1993 | Graczyk et al. | 379/96 |
| 5,195,130 | 3/1993 | Weiss et al. | 379/96 |
| 5,197,062 | 3/1993 | Picklesimer | 370/15 |
| 5,200,987 | 4/1993 | Gray | 379/39 |
| 5,287,398 | 2/1994 | Briault | 379/38 |
| 5,333,173 | 7/1994 | Seazholtz et al. | 379/38 |

FOREIGN PATENT DOCUMENTS 5046890  2/1993  Japan ..................... 340/525

*Primary Examiner*—Curtis Kuntz
*Assistant Examiner*—Stella L. Woo
*Attorney, Agent, or Firm*—Dennison, Meserole, Pollack & Scheiner

[57] ABSTRACT

A concept is presented whereby a normal telephone set can be interconnected to a security system to function in an alternate mode of either a telephone set or a security panel whereby the security system can be accessed for both display purposes and for altering security system settings. This is accomplished by changing the data from the telephone to an ISBM format so that there is adequate bandwidth to transmit not only voice but any of various keyed data information to the control panel whereby the various required or requested actions are detected in the control panel and acted upon appropriately.

3 Claims, 4 Drawing Sheets

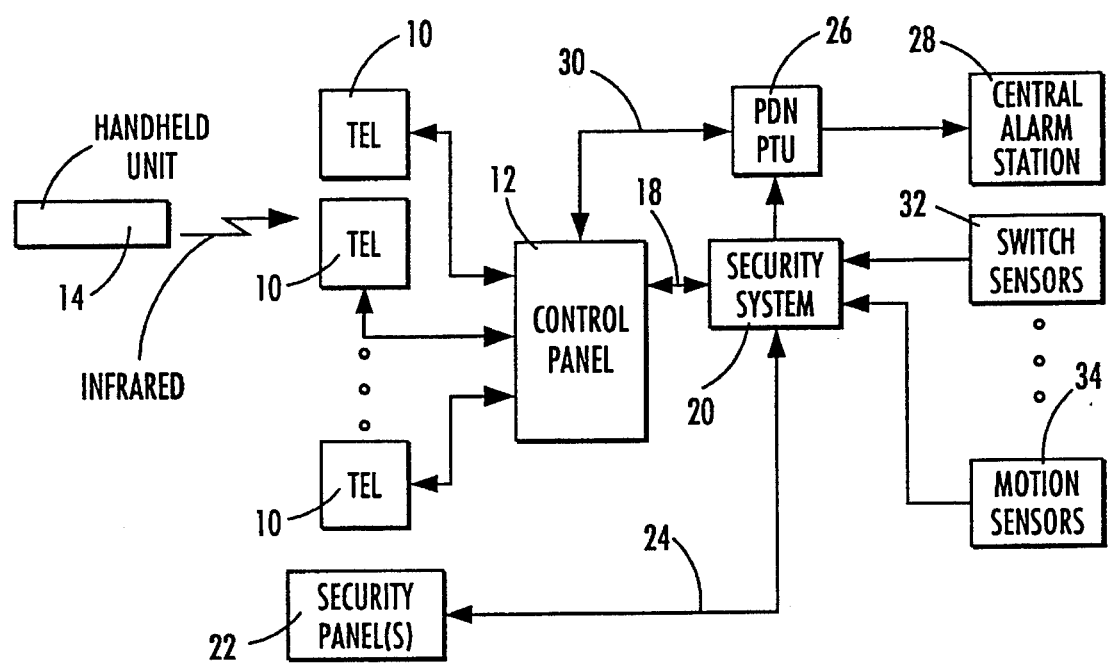
FIG. 1
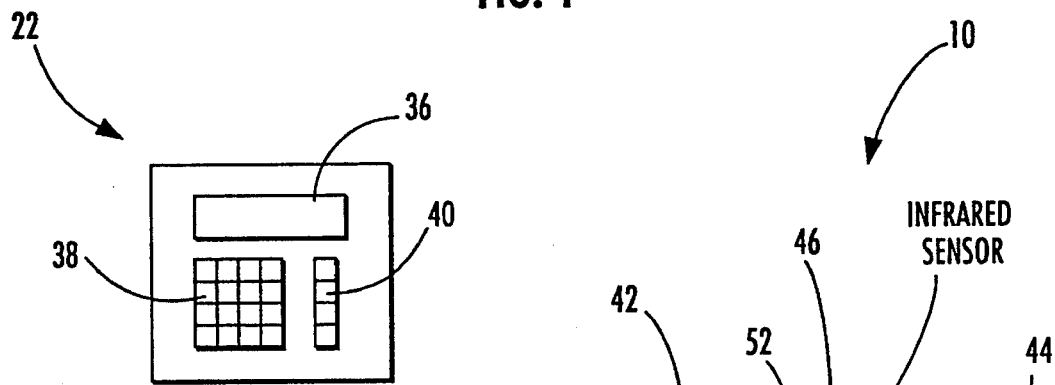
FIG. 2
FIG. 3

5,457,730

COMBINATION TELEPHONE SET AND SECURITY PANEL MONITOR

TECHNICAL FIELD OF THE INVENTION

This invention relates generally to alarm systems, and more particularly, to a method for monitoring the status of a security system from any place in the premises that has a telephone.

BACKGROUND OF THE INVENTION

Most security systems contain one or more control panels to allow monitoring of the condition of individual sensors or to allow the changing of parameters of the system. In a large building of many floors, it would be very inconvenient to have to walk all the way to a common point, such as the basement, for accessing the security system. Thus, control panels are typically placed on more than one level of the building. The installation of these control panels involves a considerable time and expense and typically these control panels are placed in out of the way situations so that the general public cannot have access to these control panels. If many people need access to the control panel, then either a great many need to be installed in closets, etc., or the people accessing it must walk through one or more common points.

It would therefore be convenient if there was a simple method of installing a control panel in the office of each person requiring access to the control panel, disguised such that the public would not normally determine that the unit is a control panel. Further, since the location of the people requiting access to the security system control panels typically changes on a fairly regular basis in most businesses, it would be desirable that the wiring or interconnection between the device and the security system be minimal.

SUMMARY OF THE INVENTION

In accordance with the present invention, a telephone set has been modified slightly by including an alternate function key which will allow the telephone to function in the alternative as a security panel and as a normal telephone set.

In most businesses, all the telephones are connected through a common control panel to the telephone company. Thus, a slight addition to the control panel would allow the circuitry in the control panel to ascertain whether or not anyone else was requesting access to security information before granting a specific telephone set permission to access the data.

BRIEF DESCRIPTION OF THE DRAWINGS

For a more complete understanding of the present invention and the advantages thereof, reference is now made to the following description of the preferred embodiments taken in conjunction with the accompanying Drawings in which:

FIG. 1 is a block diagram of the overall security system connected to a control panel and a plurality of telephones;

FIG. 2 illustrates the face of a typical security panel;

FIG. 3 represents a top surface of a typical telephone set as used in this invention;

DETAILED DESCRIPTION OF THE INVENTION

Figure 4:
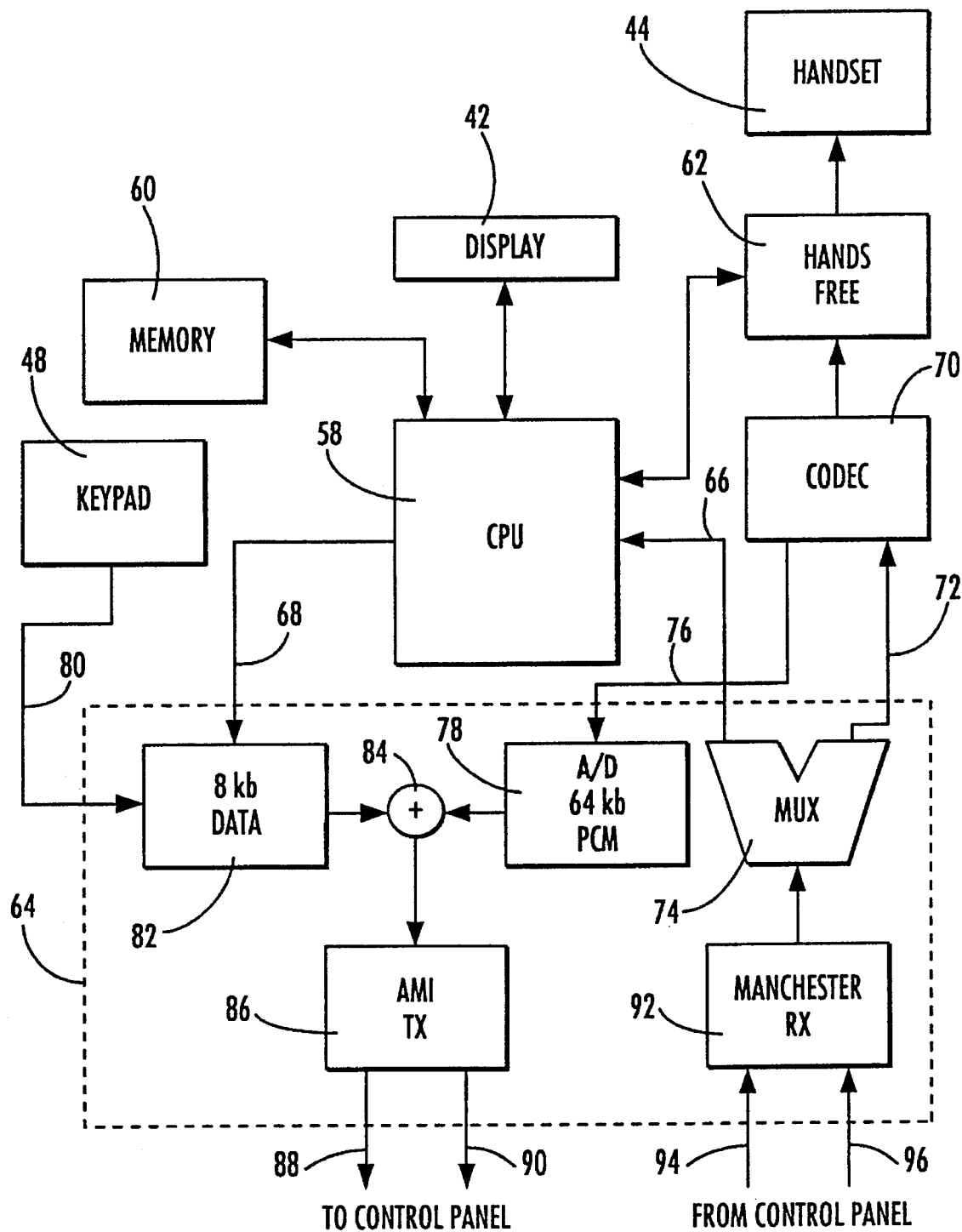
FIG. 4 is a block diagram of the circuitry within a telephone set.

In FIG. 1, three telephone sets, each labelled 10 are illustrated, connected to a control panel 12. The dots between two of the telephone units 10 indicate that there can be as many telephone units as is appropriate to the situation. A handheld infrared unit 14 is shown supplying the infrared signals to one of the telephone units 10 and each of the other telephone units can also be controlled by such an infrared unit. It will be noted that a single line is shown as the communication path between the telephone units 10 and the control panel 12 and this is used for simplicity both here and throughout the rest of the drawing since substantially every communication path in FIG. 1 requires multiple wires. The control panel 12 has a line 16 supplying signals to the telephone company and has an RS 232 path 18 communicating with the main security system block 20. One or more security panels 22 is interconnected to the security panel 20 via a lead 24. The security panel 20 is connected via a PDM/PTU block 26 to a central alarm station 28. A connection 30 connects the control panel 12 directly to the PDM 26. A switch sensor designated as 32 is connected to the security system 20 as well as a motion sensor 34. The dots between blocks 32 and 34 provide an indication that many other alarm type sensors would also be typically connected to the security system, whether they be additional switch sensors, additional motion sensors or other type sensors.

In FIG. 2, the security panel 22 is illustrated in more detail as having a display 36, a set of numerical keys or keypad 30 very similar to that typically found on a telephone and labelled as 38, and a further set of function keys 40.

FIG. 3 illustrates a panel of a typical telephone set 10 which has a display 42, a handset 44, an infrared sensor 46, a typical keypad 48, a light and hot key 50 and a further set of function keys 52. There are additional keys 54 and 56 located adjacent the hot key 50.

FIG. 4 represents the electronics within telephone set 10 and again illustrates the display with the same designation as used previously and display 42 is connected to a CPU 58 which is further connected to a memory block 60, to a handsfree voice chip block 62 and to a proprietary communication chip block 64 by an input line 66 and an output line 68. A handset 44, as previously indicated, is connected to the handsfree chip 62. A further decoder block 70 is connected between the handsfree chip 62 and the proprietary chip 64 with an input line 72 connected to a one-to-two MUX 74 within chip 64 and an output line 76 connected to an A-to-D 64 killibit PCM block 78. Another output of the MUX 74 is the previously mentioned line 66 going to CPU 58. A keypad indicated as 48 previously is shown connected via a line 80 to an 8 killibit data block 82 which also receives inputs on lines 68 from CPU 58. The outputs of the two blocks 78 and 82 combine in a summing device 84 and supplied to an alternate mark inversion block 86 which provides the two signals to the control panels in ISBM format on lines 88 and 90. A final block 92 provides Manchester signal decoding from the control panel on lines 94 and 96 to the MUX 74.

As will be realized, everything outside the dashed line 64 is substantially standard in all telephone sets. The keypad 48 would represent not only the keypad 48 of FIG. 3, but any of the other keys such as 50, 52, 54 and 56. The CODEC 70 can be a commonly purchasable chip such as an MC145502 from Motorola. The N3 voice chip 62 can be a MC34018. The CPU 58 could be a Dialog 86 C40. As will be realized by those skilled in the art, the Manchester coding is more complicated than the AMI coding. Manchester coding was used to provide a synchronous clock signal to the telephone unit and it was not necessary to provide any such information back to the control panel. Thus, the less expensive AMI coding was used when the asynchronous signals can easily be dealt with at the control panel.

Figure 5:
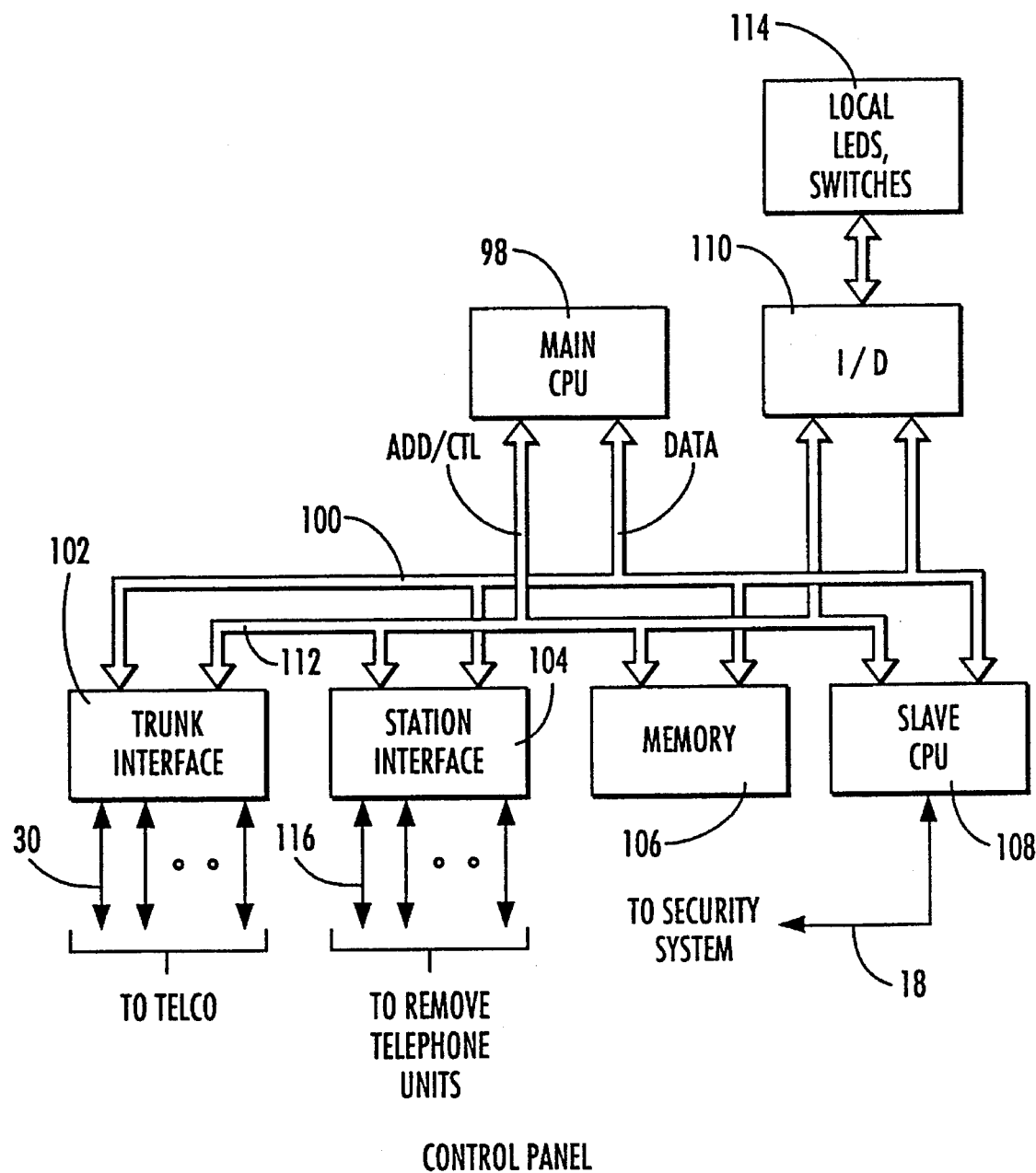
FIG. 5 illustrates the circuitry within a control panel.

In FIG. 5, a main CPU 98 is shown connected via a data bus 100 to a trunk interface block 102, a station interface block 104, a memory block 106, a slave CPU block 108 and an I/O block 110. The control line 112 is also connected to each of the recently mentioned blocks. The lines 100 and 112 are both buses and thus are shown in the form of multiple lines. A block labelled 114 is connected to the output of I/O 110 and represents the various LEDs and switches that appear on the control panel. The trunk interface block 102 is connected by a plurality of lines 18 are connected to the telephone company and it will be realized this was shown as a single line in FIG. 1 but in most instances will be a large number of connections. A set of lines 116 is shown connecting the station interface 104 to the various telephone units such as 10 in FIG. 1. The slave CPU 108 is connected via line 18 to the security system block 20. As will be observed, the contents of control panel 5 are completely standard and require no physical modifications for the present invention with the exception of the slave CPU which provides communication with a security system. The main CPU 98 would contain additional programming to accommodate the conversion of a telephone unit into an alternate security panel display and for setting up communication of that information with the security panel.

Figure 6:
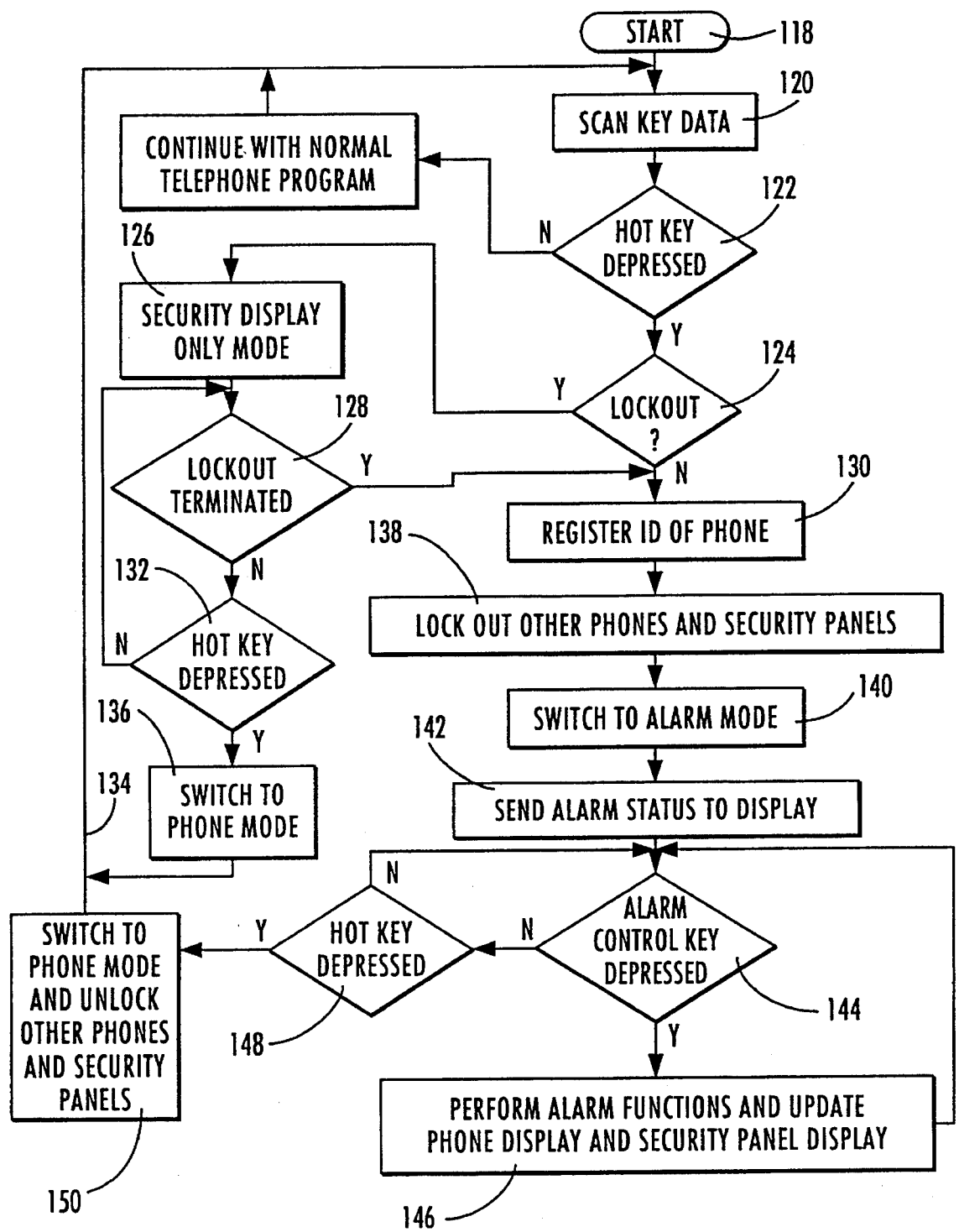
FIG. 6 is a flow diagram showing the steps taken by the CPU of FIG. 5 in providing the workings of the present inventive modification of the control panel.

FIG. 6 illustrates a flow diagram of the portion of the programming of FIG. 5 appropriate to the present invention. A block 118 initiates the start of the program and from there it proceeds to a scan key data block 120 for normal detection of whether or not any keys have been pressed since the previous scan. It first determines in a decision block 122 whether or not a hot key has been depressed. If it has not, it continues with normal telephone program operation. In other words, if it is a normal numbered keypad, it starts accumulating numbers and translating them to the telephone company. This, of course, would happen after the detection that the handset is offhook. Other functions of a normal telephone might be intercoms and conference calls, etc. If the hot key has been depressed, the system continues to a lockout block 124 where it determines whether or not there has been a lockout signal in existence, indicating that a different telephone or security panel is presently accessing the security system. If there is another unit accessing the security system, the program proceeds to a block 126 which allows the telephone unit to have a display only of information being accessed by the other security panel causing the lockout. The program proceeds from 126 through a decision block 128 which continuously checks to see whether or not lockout has been terminated. If it has been terminated, it proceeds to the low output of lockout 124 and proceeds to block 130. If, on the other hand, the lockout has not been terminated, the program proceeds to a hot key depressed block 132. If the hot key has not been depressed at this time, the program proceeds on lead 134 to the beginning of decision block 128 and continues in a loop until lockout is terminated or the hot key is depressed. If the hot key is depressed, as detected by a decision block 132, it proceeds to block 136 which switches the telephone unit back to a telephone mode and the system returns to the input of scanned key data block 120.

Returning now to decision block 130 in the flow diagram, the system will register the ID of the phone having the hot key depressed. It will then proceed with getting the other phones and security panels locked out in block 138 and then proceed to block 140 where it will switch the interpretation of depressed keys to that indicative of the security panel. The program will then proceed to block 142 where an alarm status indication is provided to the display of the telephone unit 10. The program then proceeds to a decision block 144 where it checks to see whether or not an alarm control key for accessing information on the security panel has been depressed. If it has, the program proceeds to block 146 to perform the alarm functions, update the phone display and the security panel display and then it returns to the input of decision block 144. If the determination is made that an alarm control key has not been depressed, it proceeds to a hot key decision block 148 to see whether or not a hot key has been depressed. If a hot key has been depressed, indicating that the user is interested in returning to the telephone mode, the system proceeds to block 150 where it is switched to the telephone mode operation, the other phones and security panels are unlocked and it proceeds to the input of block 120. On the other hand, if a hot key has not been depressed, it returns to the input of decision block 144 until the next check time occurs.

OPERATION

In normal operation, the operation of the telephone units such as 10 is very straightforward. When either the handset 44 is lifted to create an offhook condition or a similar condition in the speaker phone button such as 54 is depressed, the control panel 12 will detect same and start accumulating data with respect to that telephone. If keys are not depressed, an offhook message will eventually be provided to the telephone as is standard. If, on the other hand, the keys are depressed for dialing a phone number or activating a telephone function, this information will be distributed as appropriate to the telephone company or to call another telephone within the building.

When in the normal operation of scanning the incoming data from each of the telephones, there is a detection of a hot key being depressed as shown in decision block 122 of FIG. 6, the control panel must check with the security system 20 to ascertain whether another telephone unit or security panel is presently accessing data in the security system and thus raising the lockout signal. If there is presently a lockout condition, the program will proceed to block 126 and display on display 42 the information that is being accessed by the panel causing the lockout. The telephone unit 10 stays in that condition until a hot key is depressed, returning the unit to a telephone mode as shown in block 136 or until the party causing the lockout terminates the lockout condition and the telephone is then allowed to switch to the alarm mode, as indicated in block 140 and accesses the security system until a hot key is again depressed, showing the desire of the user of that telephone to return to a normal telephone mode.

The station interface 104 of control panel 12 includes a Manchester coding hookup for supplying any data to each telephone in the Manchester coded format. The station interface also includes circuitry for receiving incoming AMI data and distributing it to the telephone company, memory 106 or to security systems via slave CPU 108 as appropriate.

While I have described one embodiment of my inventive concept, I wish to be limited not to the specific embodiment shown, but only to the inventive concept as set forth by the appended claims.

Although the preferred embodiment has been described in detail, it should be understood that various changes, substitutions and alterations can be made therein without departing from the spirit and scope of the invention as defined by the appended claims.

What is claimed is:

1. A method of utilizing display type telephone sets connected to a common control panel to function in the alternative as a security panel of a security system and as a telephone set where said control panel is interconnected to both a public telephone network and a security system comprising, in combination:

incorporating a "hot-key" in each telephone set for altering the function of said telephone set;

monitoring the key condition of all keys in each of the telephone sets at the common control panel;

altering the interpretation of key depressions from a given telephone set upon detection of activation of the "hot-key" in said given telephone set; and locking out other telephone sets and security panels from alarm mode access to security system information until the given telephone set returns to a telephone mode.

2. The method of claim 1 comprising the additional step of:

displaying data, on a given telephone set, where that data is being accessed by another unit acting as the security panel with alarm mode access when the given telephone set is attempting to function as a security panel but is locked out by the control panel.

3. The method of claim 1 comprising the additional step of:

activating an indicator on said telephone set when the control panel has successfully locked out all other units from acting as a security panel in the alarm mode.

* * * * *